United States Patent [19]

Mullen

[11] Patent Number: 4,738,114
[45] Date of Patent: Apr. 19, 1988

[54] TEMPERATURE-CONTROLLED FOOD DISPENSER

[75] Inventor: Joseph F. Mullen, Norristown, Pa.

[73] Assignee: Portion Control Systems, Inc., Norristown, Pa.

[21] Appl. No.: 920,153

[22] Filed: Oct. 16, 1986

[51] Int. Cl.[4] .............................................. F25B 21/02
[52] U.S. Cl. ................................. 62/3; 221/150 HC; 222/146.1
[58] Field of Search .......... 62/3; 221/150 R, 221 HC, 221/221 A; 222/146.1, 146.5, 146.6

[56] References Cited

U.S. PATENT DOCUMENTS

| | | | |
|---|---|---|---|
| 3,251,188 | 5/1966 | Dean et al. ................................. | 62/3 |
| 3,351,233 | 11/1967 | Chanoch et al. ...................... | 62/3 X |
| 4,627,242 | 12/1986 | Beitner ...................................... | 62/3 |

*Primary Examiner*—Lloyd L. King
*Attorney, Agent, or Firm*—Dann, Dorfman, Herrell & Skillman

[57] ABSTRACT

A portable temperature-controlled food dispenser is provided for dispensing condiments, salad dressings and related types of foods under temperature control to prevent or at least retard food spoilage by preferably suitably cooling such foods. A thermally-conductive receptacle on the dispenser receives and supports selected alternative arrangements of thermally-conductive magazines for dispensing individual portion packs of food and thermally-conductive bulk storage food dispensing containers. The receptacle enables heat transfer between the receptacle and the selected arrangement of magazines and food containers on the receptacle. An electrically-powered heat exchanger is thermally coupled with the receptacle to enable heat transfer between the heat exchanger and the receptacle. A power supply circuit is connected with the heat exchanger to enable electric power to be supplied to the heat exchanger to effect the heat transfer between the heat exchanger and the receptacle to control the temperature of the selected arrangement of magazines and food dispensing containers on the receptacle.

19 Claims, 5 Drawing Sheets

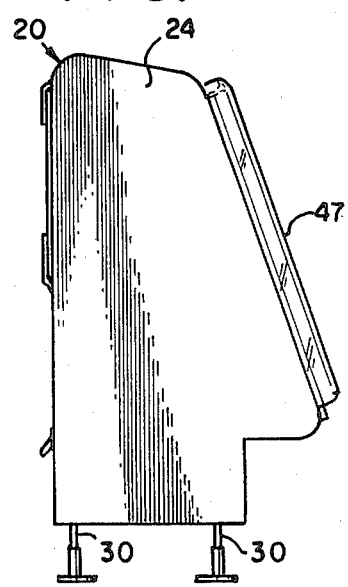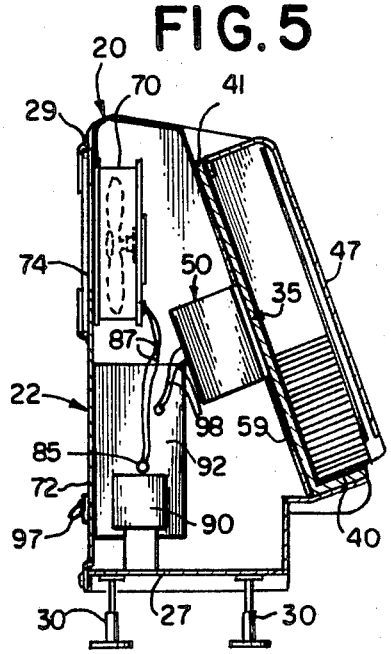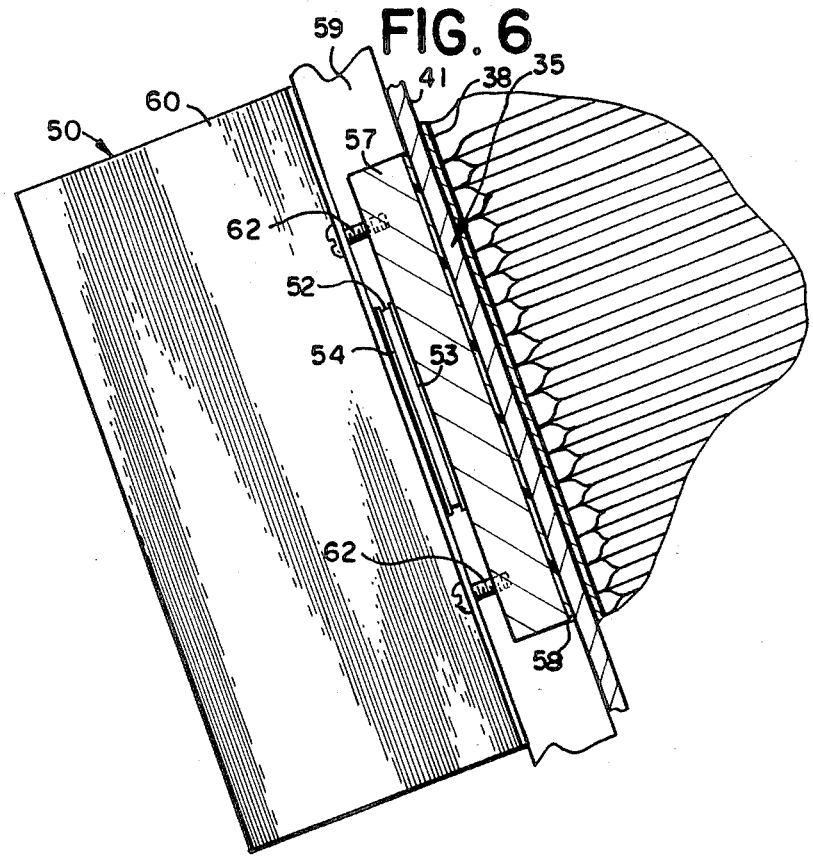

TEMPERATURE-CONTROLLED FOOD DISPENSER

FIELD OF THE INVENTION

The present invention relates to a food dispenser and, more particularly, to a temperature-controlled food dispenser for dispensing condiments, salad dressings and related types of food.

BACKGROUND OF THE INVENTION

In many food service establishments, and particularly convenience stores and fast food restaurants, condiments, salad dressings and related types of foods are provided on a self-service basis. Often condiments, such as ketchup or mustard, are made available in individually sealed portion packs containing premeasured portions of the condiment. Containers of the portion packs are generally located at self-service counters where patrons may take as many portion packs as needed. Since the portion packs are not typically metered from a dispenser, many patrons simply grab a handful of the portion packs. This leads to undue waste and expense.

As an alternative to portion packs, many food service establishments employ bulk storage containers to dispense the requisite condiments and salad dressings. In still other establishments, the bulk storage dispensers are employed to supplement the portion packs.

Since it is often necessary to refrigerate various salad dressings or condiments, such as mayonnaise, conventional food dispensers often employ ice storage containers to control the temperature of the food. The use of ice to maintain temperature control is not always satisfactory. One of the major problems is that the ice in the food dispenser must be replaced relatively often to maintain proper temperature control. Another problem is that in handling ice, water spillage and leakage may also occur. Since self-service condiment dispensers are often used in areas of relatively high patron traffic, water spillage or leakage from the melting ice in the dispenser poses a significant problem, particularly if the water leaks or spills onto the floor surrounding the dispenser.

Another significant drawback with conventional food dispensers is the lack of versatility in accommodating both portion packs and bulk storage containers. With conventional systems, entirely separate dispensing units are required for use with bulk storage containers and with portion packs. The use of separate dispensing units, however, is not only expensive but it is also extremely inefficient. Separate dispensing units required additional maintenance, as well as additional counter space, which is often not readily available.

Since there are often seasonal fluctuations in the types of food which are sold, the capability of employing a single food dispenser which can be used with either bulk storage food containers or portion packs is certainly desirable. In accordance with the present invention, a unique temperature-controlled food dispenser is provided which accommodates selected combinations of bulk storage and portion pack dispensing containers. The food dispenser of the present invention is electrically powered to provide the desired temperature control and is extremely versatile in application. The food dispenser in accordance with the present invention may be readily used with either bulk storage containers or portion packs, or even a selected combination of such dispensing containers, in order to accommodate fluctuations in the demand for various types of food or condiments.

In order to minimize the effort and time required for clean-up, disposable bulk storage and portion pack dispensing containers may be utilized with the dispenser in accordance with the present invention. By utilizing disposable dispensing containers, an empty dispensing container may simply be discarded and replaced with a fresh dispensing container. As such, the need to clean empty dispensing containers is alleviated, therefore reducing labor costs. Further, the possibility of food spoilage or contamination caused by improper cleaning and suitable temperature control is also eliminated.

SUMMARY OF THE INVENTION

In accordance with the present invention, a portable electrically-powered food dispenser is provided for dispensing condiments, salad dressings and related types of foods under temperature control to prevent or at least retard food spoilage. A plurality of thermally-conductive magazines for dispensing individual portion packs of food, such as condiments and salad dressings, are removably supported on the dispenser. In addition, a plurality of thermally-conductive bulk storage food containers are also removably supported on the dispenser.

The food dispenser includes a frame which provides a housing for the dispenser. A thermally-conductive receptacle for the magazines and bulk storage containers is supported on the frame. The thermally-conductive receptacle is configured to receive and support selected alternative arrangements of the magazines and the bulk storage containers in removable position on the receptacle. The thermally-conductive receptacle enables heat transfer between the receptacle and the selected arrangement of magazines and food containers on the receptacle. A selected arrangement of containers on the receptacle may incorporate only magazines, while another alternative arrangement may incorporate solely bulk storage containers. In yet other alternative arrangements, selected combinations of the magazines and bulk storage containers may be positioned on the receptacle.

Electrically-powered heat exchange means is thermally coupled with the receptacle to enable heat transfer between the heat exchange means and the receptacle. Power supply means is connected with heat exchange means to enable electrical power to be supplied to the heat exchange means to effect the heat transfer between the heat exchange means and the receptacle in order to control the temperature of the selected arrangement of magazines and food containers on the receptacle. An insulative cover may be employed to enclose and insulate the magazines and food containers on the receptacle.

BRIEF DESCRIPTION OF THE DRAWINGS

The foregoing summary, as well as the following detailed description of the preferred embodiments of the present invention, will be better understood when read in conjunction with the appended drawings in which:

FIG. 4 is a side elevational view of the food dispenser illustrated in FIG. 1;

FIG. 5 is a side sectional view of the food dispenser illustrated in FIG. 1 with the side panel removed to show the internal structure and circuit connection for electrical components in the dispenser;

FIG. 6 is an enlarged fragmentary sectional view of the food dispenser taken along line 6—6 of FIG. 2 to show a heat exchange assembly used in the dispenser to provide temperature control;

DETAILED DESCRIPTION OF THE PREFERRED EMBODIMENTS

Figure 1:
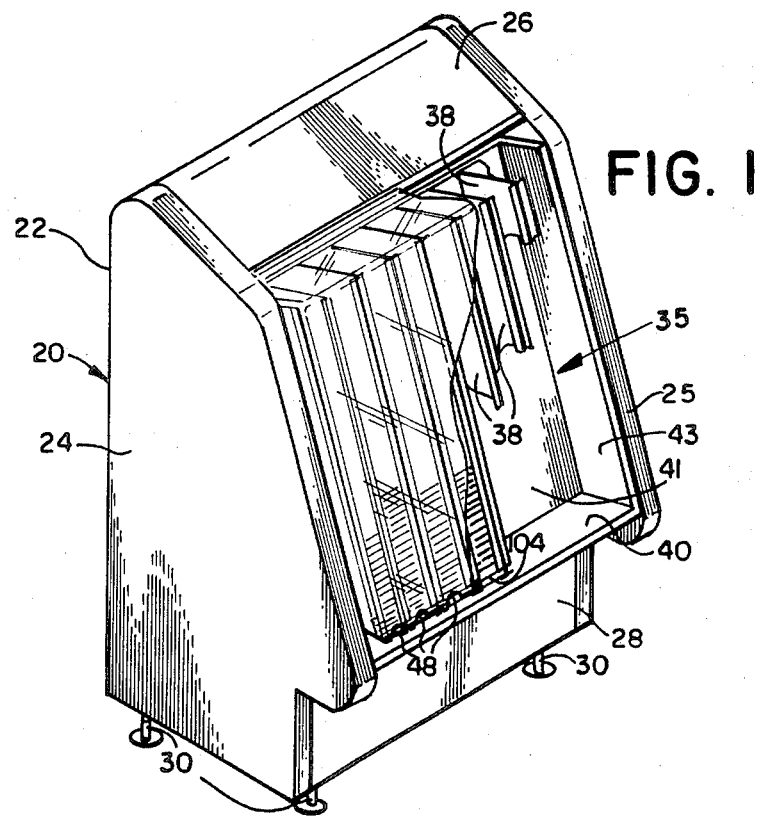
FIG. 1 is a perspective view of the temperature-controlled food dispenser in accordance with a preferred embodiment of the present invention.

Referring to the figures and, initially to FIG. 1, a temperature-controlled food dispenser, generally designated 20, is depicted for dispensing condiments, salad dressings and related types of food. The food dispenser 20 is a portable unit which is electrically powered to provide temperature control over the food to be dispensed by the unit. In one preferred particular application, the dispenser 20 refrigerates the food on the dispenser to prevent or retard spoilage.

The food dispenser 20 includes a thermally insulative housing 22 which serves as a support frame for the dispenser. The housing 22 includes generally parallel side walls 24 and 25, a top wall 26, a bottom wall 27, a front wall 28 and a back wall 29. The housing 22 rests upon support stands 30 at the respective corners of the bottom wall 27 of the housing. The support stands 30 are configured to rest upon a generally planar horizontal surface to support the dispenser in a stable generally upright position. The support stands 30 elevate the bottom surface 27 of the housing 22 so that predetermined clearance exists between the bottom wall 27 of the housing 22 and the surface upon which the dispenser 20 rests.

As illustrated in FIGS. 1 and 5, the dispenser 20 includes a thermally-conductive receptacle, generally designated 35, supported in fixed position at the front wall 28 of the housing 22. The receptacle 35 is constructed of a rigid thermally-conductive material, such as aluminum, and is configured to removably support a plurality of different-sized food dispensing components in position on the dispenser. The food dispensing containers may be of a variety of different sizes and types. For example, as illustrated in FIG. 1, the food dispensing components are in the form of elongated magazines 38 for dispensing individual portion packs of food, such as condiments or salad dressing. The magazines 38 are preferably constructed of a thermally-conductive material, such as aluminum, so that during operation a desired heat transfer is achieved between the magazines 38 and the thermally-conductive receptacle 35. In specific operation, the food dispenser functions to refrigerate the food so that heat is extracted away from the magazines 38 of food and into the thermally-conductive receptacle 35.

In an effort to facilitate heat transfer between the magazines 38 and the thermally-conductive receptacle on the dispenser, it is desirable to maximize the surface area of contact between the receptacle 35 and the magazines 38 supported on the receptacle 35. For this purpose, the receptacle includes a thermally-conductive platform 40 for contacting and supporting the selected arrangement of food dispensing containers, such as magazines 38, in removable position on the receptacle 35. The platform 40 provides a generally planar surface for engaging the bottom surface of each food dispensing container, such as magazines 38, in generally flush contact. The platform 40 is held and supported in fixed position on the housing at a slight angle of elevation relative to the horizontal so that the magazines 38 rest upon the platform 40 and tilt slightly inwardly to rest against the back wall 41 of the receptacle 35 of the dispenser 20, as shown in FIG. 1.

In order to retain the food dispensing containers, such as magazines 38, on the platform 40, the receptacle 35 includes the thermally-conductive back or retaining wall 41 fixed to the platform in a generally upright position for contacting and supporting the selected arrangement of magazines 38 on the platform 40. The retaining wall 41 is positioned generally perpendicular to the platform 40 and provides a generally planar surface for preferably making generally flush contact with the back walls of the food dispensing containers such as magazines 38 on the platform 40.

To further increase the potential surface area of contact between the receptacle 35 and the food dispenser containers on the receptacle, the receptacle includes thermally-conductive side walls 43 fixed at opposite ends of the platform 40 and retaining wall 41 in a generally upright position and generally perpendicular to the platform 40 and retaining wall 41. The side walls 43 contact and retain the selected arrangement of food dispensing containers on the platform 41. The thermally conductive side walls 43 provide generally planar surfaces for contacting the food dispensing containers in the end positions of a side-by-side arrangement of containers on the receptacle 35. The side walls 43 provide additional areas of contact between the receptacle 35 and the selected arrangement of food dispensing containers, such as magazines 38, on the receptacle to increase heat transfer between the receptacle 35 and the food dispenser containers on the receptacle 35. To increase the efficiency of the heat transfer, the thermally-conductive receptacle 35 is generally inset into the insulative housing 22, so that preferably, generally only the surfaces of the receptacle 35 provided for contacting the food dispensing containers are exposed.

As shown in FIG. 1, the receptacle 35 is dimensioned in size relative to the food dispensing containers, such as the magazines 38, so that the receptacle supports a predetermined number of food dispensing containers in side-by-side position or relationship on the receptacle 35. It is desirable to position the food dispensing containers in side-by-side contacting arrangement on the receptacle 35 in order to minimize the surface area of exposure of the food dispensing containers to ambient air. To further minimize undesired heating of the food dispensing containers by ambient air, a removable insulative cover 47 is provided for generally enclosing and insulating the food dispensing containers on the thermally-conductive receptacle 35 of the dispenser. The cover 47 removably mounted or supported onto a suitable holding device, such as clasps or hooks. The cover 47 is generally transparent so that the quantity of food in the food dispensing containers on the receptacle 35 can be viewed by a user without the need to remove the cover. As illustrated in FIG. 1, when magazines 38 of portion packs of food are used with the dispenser, the cover desirably includes finger notches 48, positioned in registry with the bottom output opening of each magazine 38 on the receptacle 35 to permit a finger to be inserted into the magazine so that manual removal of individual portion packs from each magazine can be effected with relative ease without removing the cover 47.

Figure 2:
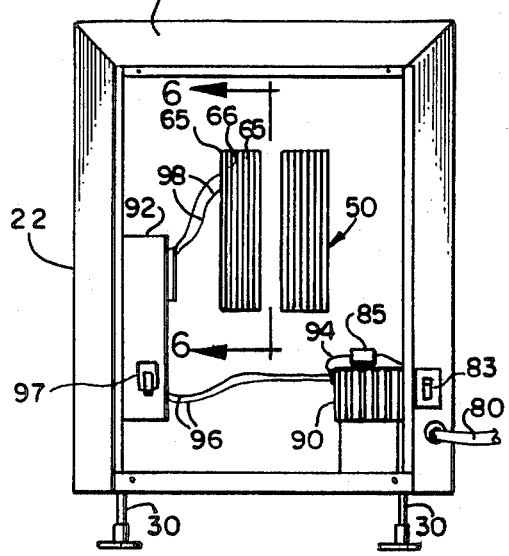
FIG. 2 is a rear elevational view of the food dispenser illustrated in FIG. 1 but with a back panel removed.

In order to maintain effective temperature control and, specifically, refrigeration of the food in the food dispensing containers on the receptacle 35, heat must be extracted from the food dispensing containers and the thermally-conductive receptacle 35. For this purpose, the dispenser 30 includes an electrically-powered temperature or heat exchange means or system thermally coupled with the receptacle 35 to enable temperature or heat transfer between the heat exchange system and the receptacle. More specifically, the heat exchange system in the preferred embodiment in FIGS. 1–6 serves to cool the receptacle to properly refrigerate the food or condiments in the receptacle. It should be appreciated, however, that the heat exchange system would be employed to heat the receptacle, if desired, for certain food products, such as melted cheese. To effect the necessary heat transfer, a heat transfer assembly, generally designated 50, is thermally coupled with the receptacle 35. As shown in FIG. 6, the heat transfer assembly 50 includes an electrically-powered thermoelectric heat transfer module 52 for converting electrical power to thermal energy. The heat transfer module 52 is a generally flat, two-sided electrical device which is electrically connected with a source of electrical power by conductor 98 as shown in FIGS. 2 and 5. The electrical power supplied to the module 52 is converted by the module 52 into thermal energy so that a first side 53 of the module 52 becomes cool in order to extract heat and a second side 54 of the module becomes hot in order to radiate heat.

In order to cool the food on the receptacle 35, the first or cool side 53 of the module 52 is thermally coupled with the receptacle 35. To increase the thermal coupling between the first side 53 of the module and the thermally-conductive receptacle 35, a thermally-conductive shoe 57 is positioned intermediate the module 52 and the receptacle 35. The shoe is positioned in direct and thermal contact with the first side 53 of the thermoelectric module 52 and in thermal contact with the receptacle 35. As shown in FIG. 6, the thermally-conductive shoe 57 is secured to a back surface of the retaining wall 41 of the receptacle 35 by a thermally-conductive adhesive. In order to facilitate heat radiation from the second side 54 of the module, a heat sink 60 is held in thermal contact with the second side 54 of the module 52. Screws 62 passed through the heat sink 60 are screwed into the thermally-conductive shoe 57 to hold the thermoelectric module 52 in compression between the heat sink 60 and the shoe 57, so that the thermoelectric module is in effective thermal contact with the shoe 57 and the heat sink 60. A thermally insulative layer 59, such as foam, is applied to the back surface of the retaining wall 41 within the housing to thermally isolate the receptacle 35 from the heat sink 60 within the housing 22. The insulative layer 59 preferably comprises a water or liquid impermeable material, so that layer 59 can be applied to the back surface of the retaining wall 41 in a manner which encloses and encapulates the thermoelectric module 52. Since water or condensation may adversely affect the performance of the thermoelectric module 52, the insulative layer 59 provides a water barrier to keep the module 52 dry.

To increase heat radiation away from the module 52, the heat sink 60 includes a series of heat radiating fins 65 which project away from the second side 54 of module 52 into the air space within the housing 22. The fins 65 are generally planar plates made of a thermally-conductive material, such as aluminum. The fins are oriented generally parallel to one another and are spaced apart from one another to provide air channels 66 for free flow of air between the respective fins 65.

In order to increase the exchange of heat radiated from the fins 65 of heat sink 60 to ambient air, the heat exchange system includes an air pump in the form of an electrically-powered axial fan 70 supported on back panel 72 of the housing for creating a flow of ambient air through the heat sink 60.

Figure 3:
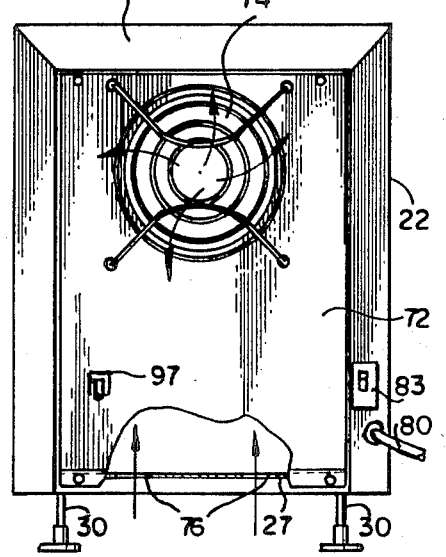
FIG. 3 is a rear elevational view of the food dispenser illustrated in FIG. 1 showing part of the back panel broken away to illustrate air flow into the dispenser.

As best illustrated in FIG. 5, the heat exchange assembly 50 is mounted onto the thermally-conductive receptacle 35 generally internally of housing 22. The heat exchange assembly 50 is generally enclosed within the housing 22 thereby requiring heat to be exhausted from the housing to permit efficient operation. For most efficient heat transfer the fan 70 is fixed to the removable back panel 72 on the back wall 29 of the housing 22 and is positioned in registry with an air outlet opening 74 in the back panel 72, as shown in FIGS. 3 and 5. Air inlet openings 76 for the housing are provided in the bottom wall 27 of the housing 22. As shown in FIG. 3, stands 30 elevate the bottom wall 27 of the housing from the surface on which the dispenser is supported to enable a free flow of air into the housing 22 through the air inlet openings 76.

In operation, the electrically-powered fan 70 creates an air flow through the housing. The fan 70 causes an intake of ambient air to flow into the housing 22 through air inlet openings 76. The ambient air is then forced through the heat sink 60 of the heat exchange assembly 50. More specifically, the ambient air flows through the air channels 66 between the heat radiating fins 65 of the heat exchange assembly 50 so that heat from the fins 65 is efficiently radiated into the flow of ambient air. The heated ambient air is then exhausted by the fan 70 through the air outlet opening 74 of the housing.

Figure 9:
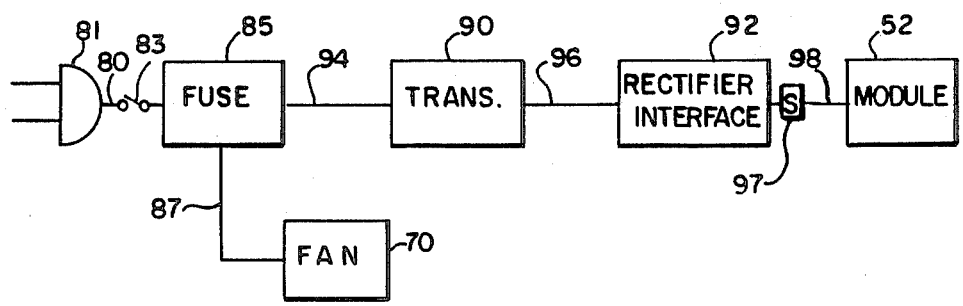
FIG. 9 is a general schematic diagram of the electrical circuitry for the food dispenser in accordance with the present invention.

Since the fan 70 and the thermoelectric module 52 both require electrical power, the dispenser includes power supply circuitry. As shown in FIGS. 2 and 9, the dispenser includes a power input cord 80 and plug 81 for connection with a source of A.C. power. Switch 83 connected with the input cord 80 enables the dispenser 26 to be turned on and off. Switch 83 is in turn, connected with a fuse 85, which functions to, protect the circuitry of the system from overload conditions, such as high transient voltages and current. As shown in FIGS. 5 and 9, the fan 70 is connected with the source of A.C. power via conductors 87 connected with the fuse 85.

Since the thermoelectric module requires a source of D.C. power, the module 52 is connected with the fuse 85 through a transformer 90 and an associated rectifier circuit 92. The primary winding of the transformer 90 is connected with the source of A.C. power through fuse 85 by conductors 94. The transformer converts A.C. voltage supplied to the primary winding to a desired A.C. voltage at the secondary winding. The secondary winding of the transformer is connected with the rectifier circuitry 92 by conductor 96. The rectifier circuitry 92 is connected with the thermoelectric module 52 of the heat exchange assembly by a polarity switch 97 and conductors 98. The rectifier circuitry 92 functions to rectify the A.C. voltage from the secondary winding of the transformer to a desired D.C. voltage for supply to the thermoelectric module 52 of the heat exchange assembly 50. As previously mentioned, in the preferred embodiment discussed, herein, the thermoelectric module is connected to cool the receptacle for maintaining the proper refrigeration of the food or condiments on the receptacle. However, it should be appreciated that the thermoelectric module may be employed to heat the receptacle, if desired, by simply activating polarity switch 97 to reverse the polarity connection of the D.C. voltage to the thermoelectric module, which results in heating the thermally-conductive shoe 57 and receptacle 35.

Figure 7:
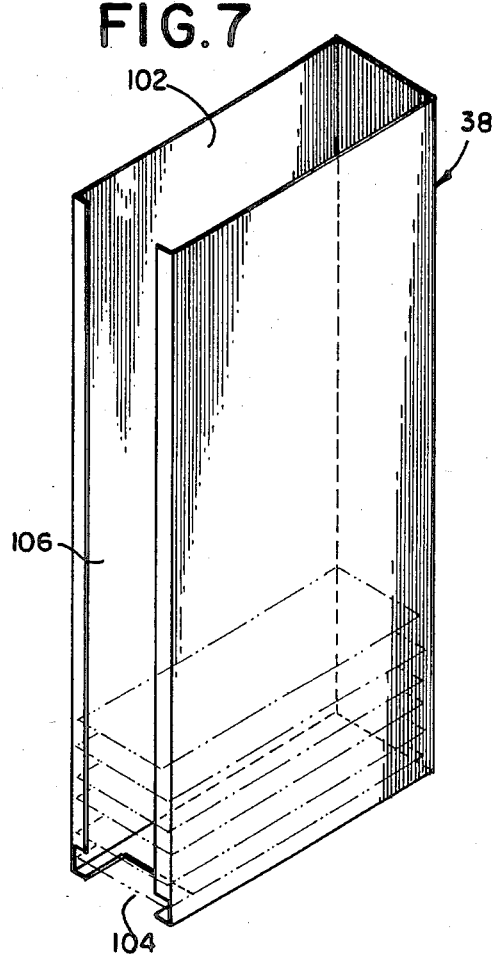
FIG. 7 is an enlarged perspective view of a refillable magazine for dispensing individual portion packs of food in accordance with the present invention.

As shown in FIGS. 1 and 7, the food dispensing containers to be supported on the thermally conductive receptacle 35 of the dispenser 20 may be in the form of a refillable magazine 38 for dispensing individual portion packs of food. The magazine 38 is preferably constructed of a rigid, thermally-conductive material, such as aluminum, and is generally columnar in shape. The magazine 38 is dimensioned so a that a plurality or batch of portion packs may be inserted into the magazine through an input opening 102 at the top of the magazine. After a batch of portion packs are loaded into the magazine, the portion packs are supported by the magazine in a generally upright column in face-to-face contact with one another. The individual portion packs may be removed from the magazine 38 through an output slot 104 at the bottom of the magazine.

As shown in FIG. 1, the magazines 38 are supported on the thermal-conductive receptacle 35 in generally upright position. Accordingly, as each successive portion pack is withdrawn from the output slot 104 of the magazine 35, the remaining portion packs in the magazine move downwardly by gravity the output slot 104. The magazine 35 controls the dispensing of the portion packs from the magazine. The output slot 104 is dimensioned relative to the thickness of the portion packs so that only a single portion pack can be removed from the magazine 38 at a time. The magazine 38 has a viewing slot 106 which extends the length of the magazine to enable viewers to easily determine when the magazine is about to be emptied. When the magazine is emptied or is about to be emptied, the magazine can be removed from the thermally-conductive receptacle 35 to be refilled with a fresh batch of portion packs, inserted through input opening 102. After being refilled, the magazine 38 can be replaced back onto the thermally-conductive receptacle 35 of the dispenser.

Figure 8:
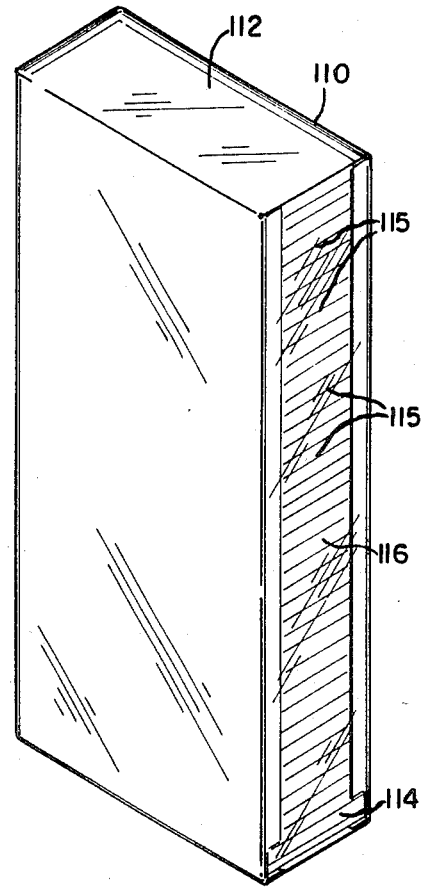
FIG. 8 is an enlarged perspective view of a disposable prepackaged magazine for dispensing portion packs of food in accordance with the present invention.

Instead of using refillable magazines, prepackaged disposable magazines 110, as illustrated in FIG. 8, may also be employed with the dispenser 20. The disposable magazine 110 is preferably constructed of a thermally-conductive material such as a relatively thick aluminum foil. Alternatively, the magazine may be constructed of other suitable materials, such as cardboard or foil-lined cardboard.

The magazine 110 may include an input opening 112 to permit the disposable magazine to be initially filled with a batch of portion packs 115. After being filled, the disposable magazine 110 can be wrapped in cellophane to facilitate subsequent handling. The disposable magazine 110 is preferably dimensioned to support the portion packs in a column in generally face-to-face contact with one another, as described with the rigid magazine 38. Also, as with the refillable rigid magazine 38 illustrated in FIG. 7, the disposable magazine 110 includes an output opening 114 at the bottom of the magazine for metering the output of portion packs. The magazine 110 is similarly supported on the thermally-conductive receptacle 35 of the dispenser 20 in generally upright position so that the portion packs are fed to the output opening 114 by gravity as each successive portion pack is removed from the magazine 110. The magazine 110 further includes a viewing slot 116 which extends the length of the magazine to enable viewing the amount of portion packs remaining in the magazine 110. Once the disposable magazine 110 is emptied of portion packs 115, the empty magazine 110 may be discarded and replaced with a fresh disposable magazine of portion packs.

Figure 10:
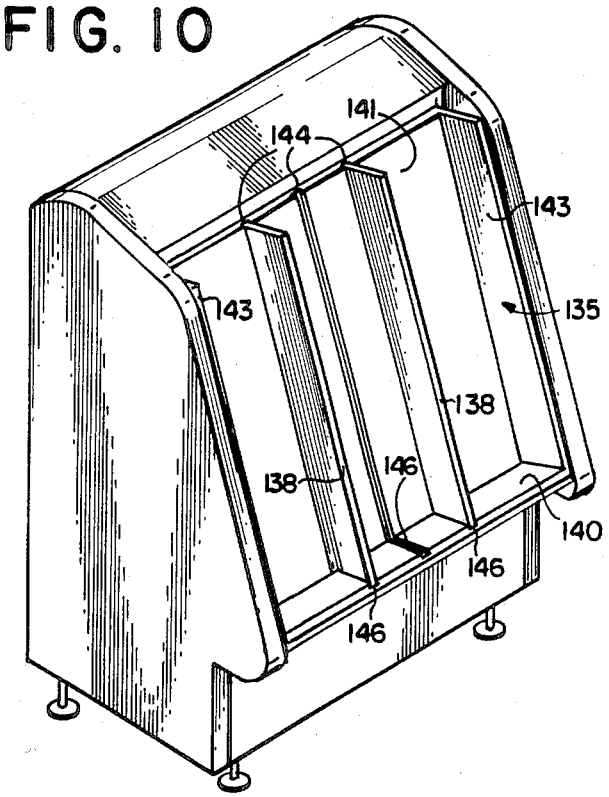
FIG. 10 is a perspective view of a food dispenser in accordance with another preferred embodiment of the present invention in which removable divider walls are used for dividing the dispenser into predetermined areas.

In FIG. 10, another preferred embodiment of temperature-controlled food dispenser, generally designated 120, in accordance with the present invention is depicted. The food dispenser 120 depicted in FIG. 10 is substantially similar in function and operation to the food dispenser 20 depicted in FIG. 1, except that food dispenser 120 includes a thermally-conductive receptacle 135 having thermally-conductive divider walls 138, which are removably mountable at predetermined positions within the receptacle 135. The divider walls 138 are constructed of a thermally-conductive material, such as aluminum. To permit the divider walls 138 to be repositioned within the receptacle 135, the retaining wall 141 of the receptacle 125 includes a series of elongated slots 144 oriented generally perpendicular to the platform 140 and generally parallel to side walls 143 of the receptacle 135. The elongated slots 144 extend the length of the retaining wall 136 and are dimensioned to receive each divider wall 138 in friction fit. To provide increased stability of the divider walls 138, support slots 146 aligned with slots 144 may also be provided in the platform 140 of the receptacle 135 to receive and hold, in friction fit, the bottom portion of the divider walls 138. The divider walls 138 provide additional area of contact for effective temperature control between the receptacle 135 and the selected arrangement of food dispensing components on the receptacle 135, in order to increase heat transfer between the receptacle 135 and the selected arrangement of food dispensing components on the receptacle 135. By utilizing divider walls 138, which are preferably removably mountable within the receptacle 135 at selected positions between the side walls 143 of the receptacle, the divider walls 138 can be used to divide the receptacle 135 into predetermined receiving areas for the selected arrangement of food dispensing components.

Figure 11:
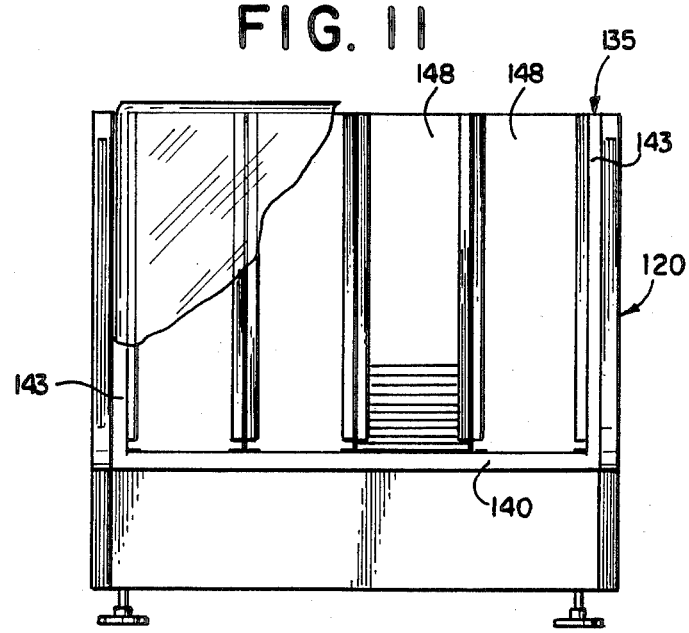
FIG. 11 is a front elevational view of the food dispenser illustrated in FIG. 10 but showing the divider walls removed and showing an insulative cover partially broken away, the magazines for dispensing individual portion packs of food being illustrated positionnd in side-by-side arrangement on the dispenser.

For increased versatility, the divider walls 140 can be removed entirely from the receptacle 135. As shown in FIG. 11, the dispenser 120 may have the divider walls 138 completely removed so that the receptacle is dimensioned in size, without the retaining walls, to accept a predetermined number of food dispensing components, such as magazines 148, in side-by-side position or relationship on the receptacle. The magazines 148 are dimensioned in size relative to the receptacle 135 so that four magazines may be positioned on the receptacle 135 with the side walls of each magazine 148 abutting the side walls of adjacent magazines 148 for effective temperature control. As also shown in FIG. 11, the side walls of the outside magazines in the end positions desirably abut the adjacent side walls 143 of the receptacle 135.

Figure 12:
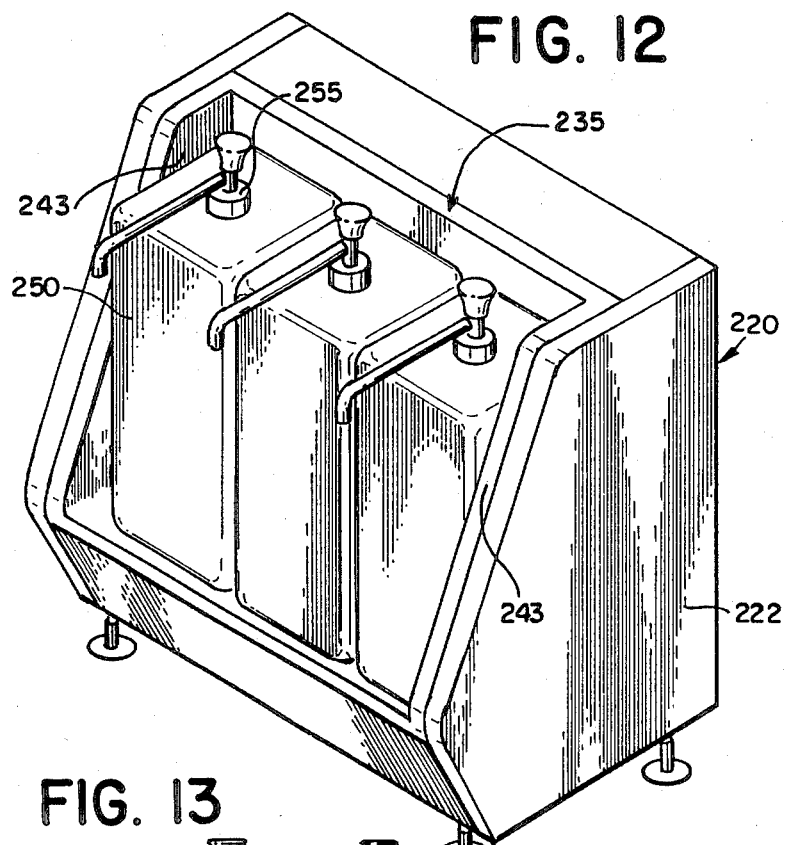
FIG. 12 is a perspective view of a food dispenser in accordance with still another preferred embodiment of the present invention in which bulk storage containers of food are supported on the dispenser in side-by-side arrangement.
Figure 13:
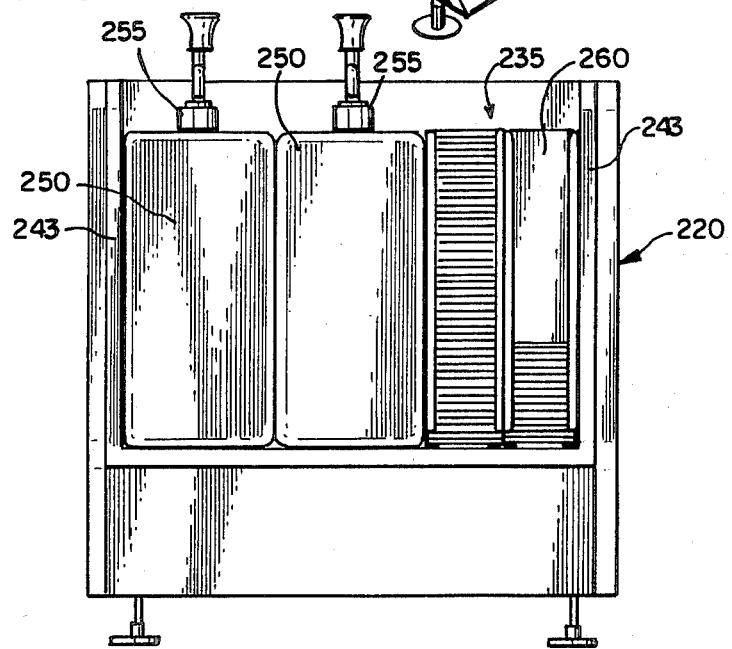
FIG. 13 is a front elevational view of the dispenser illustrated in FIG. 12 but showing two magazines of portion packs substituted for a bulk storage container so that two bulk storage containers and two magazines are supported on the dispenser in side-by-side arrangement.

As illustrated in FIGS. 12 and 13, a temperature-controlled food dispenser 220 in accordance with another embodiment of the present invention is depicted. The food dispenser 220 depicted in FIGS. 12 and 13 is substantially similar in function and operation to the food dispenser 20 depicted in FIG. 1, except that the food dispenser 220 depicted in FIGS. 12 and 13 includes a housing 222 with a slightly different shape. More specifically, the housing 222 of the food dispenser 220 depicted in FIGS. 12 and 13 includes more rounded outer surfaces which minimize sharp edges and corners in order to prevent or at least minimize dirt accumulation on the housing.

The food dispenser 220 shown in FIGS. 12 and 13 includes a thermally-conductive receptacle 235 which is substantially similar in function and operation to the receptacle 35 of the dispenser 20 depicted in FIG. 1. The dispenser 220 is configured to support a series of food dispensing components in the form of bulk storage food dispenser containers 250 in generally side-by-side arrangement on the receptacle 235. The thermally-conductive receptacle 235 of the dispenser 220 is dimensioned in size relative to the bulk storage food dispensing containers 250 so that the receptacle supports a predetermined number of bulk storage food dispensing containers 250. The bulk storage food dispensing containers 250 are supported on the receptacle 235 as shown in FIG. 12 so that the side walls of each container 250 abut the side walls of the adjacent containers 250. To maximize the efficiency of different sized food dispensing components in the form of the heat transfer between the containers 250 and the receptacle 235, the end containers in the side-by-side arrangement have side walls in generally flush contact with the adjacent side walls 243 of the receptacle. The bulk storage food dispensing containers 250 are preferably constructed of a thermally-conductive material, such as aluminum, but other materials such as cardboard or foil-lined cardboard may be used. The containers 250 may have removable pumps 255 in order to permit refilling, the pump being used to dispense food from the container. Alternatively, the containers 250 may be disposable to permit replacement with a fresh container 250 of food.

As illustrated in FIG. 13, the thermally-conductive receptacle 235 is dimensioned in size relative to the bulk storage food dispensing containers 250 and to magazines 260 so that a selected arrangement of bulk storage food dispensing containers 250 and magazines 260 may be supported on the receptacle in generally side-by-side arrangement. As such, the dispenser 220 is dimensioned to accept selected alternative combinations of bulk storage food dispensing containers 250 and magazines 260 on the receptacle 235 in generally side-by-side relationship. As shown in FIG. 13, the dispenser 220 is supporting two magazines and two bulk storage containers in side-by-side positions on receptacle 235 wherein the bulk storage containers are shown to be approximately twice as wide as the magazines. Of course, other combinations of different-sized magazines and containers may be supported on the receptacle as required during use.

In accordance with the present invention, a food dispenser is provided which readily accepts magazines for dispensing portion packs of food and bulk storage food dispensing containers in various selected combinations. As such, all magazines may be used in one selected arrangement while all bulk storage food dispensing containers may be used in another arrangement. With the dispenser in accordance with the present invention, magazines and bulk storage food dispensing containers may be freely substituted for one another on the thermally-conductive receptacle of the dispenser to accommodate changing demands for different types of food.

From the foregoing description and the accompanying drawings, it can be seen that the present invention provides a temperature-controlled food dispenser which is extremely versatile and efficient in application and use. It should be recognized that changes or modifications may be made without departing from the broad inventive concepts of the invention. It is understood, therefore, that the invention is not limited to the particular embodiments described herein, but is intended to cover all changes and modifications which are within the scope and spirit of the invention as set forth in the appended claims.

What is claimed is:

1. A temperature-controlled food dispenser comprising:
   (a) a frame;
   (b) a plurality of different-sized, thermally-conductive food dispensing components for separately dispensing food;
   (c) a thermally-conductive receptacle on the frame configured to receive and support selected alternative arrangements of said plurality of different-sized, food dispensing components in removable position on the receptacle to enable heat transfer between the receptacle and the selected arrangement of food dispensing components on the receptacle;
   (d) electrically-powered heat exchange means thermally coupled with the receptacle to enable heat transfer between the heat exchange means and the receptacle; and
   (e) power supply means connected with the heat exchange means to enable electrical power to be supplied to the heat exchange means to effect the heat transfer between the heat exchange means and the receptacle to control the temperature of the selected arrangement of food dispensing components on the receptacle.

2. The food dispenser in accordance with claim 1 wherein one of said food dispensing components comprises a thermally-conductive magazine for dispensing individual portion packs of food and another one of said food dispensing components comprises a bulk storage food container having a different size than said magazine.

3. The food dispenser in accordance with claim 1 wherein said food dispensing components comprise different-sized magazines for separately dispensing individual portion packs of food.

4. A temperature-controlled food dispenser comprising:
 (a) a frame;
 (b) a plurality of thermally-conductive food dispensing components consisting of bulk storage food containers;
 (c) a thermally-conductive receptacle on the frame configured to receive and support a selected arrangement of the food dispensing components in removable position on the receptacle to enable heat transfer between the receptacle and the food dispensing components on the receptacle;
 (d) electrically-powered heat exchange means thermally-coupled with the receptacle to enable heat transfer between the heat exchange means and the receptacle; and
 (e) power supply means connected with the heat exchange means to enable electrical power to be supplied to the heat exchange means to effect the heat transfer between the heat exchange means and the receptacle to control the temperature of the food dispensing components on the receptacle.

5. The food dispenser in accordance with claim 1 or 4 wherein the receptacle is dimensioned in size relative to the food dispensing components so that the receptacle receives a selected arrangement of said food dispensing components in side-by-side position on the receptacle.

6. The food dispenser in accordance with claim 1 or 4 wherein said receptacle includes a thermally-conductive platform for supporting the selected arrangement of food dispensing components in position on the receptacle and a thermally-conductive retaining wall fixed relative to the platform for retaining the selected arrangement of food dispensing components on the platform, the platform and the retaining wall contacting the selected arrangement of food dispensing components on the receptacle enabling heat transfer between the receptacle and the selected arrangement of food dispensing components on the receptacle.

7. The food dispenser in accordance with claim 6 wherein the receptacle includes thermally-conductive side walls fixed at opposite ends of the platform and retaining wall for contacting and containing the selected arrangement of food dispensing components on the platform and for providing additional area of contact between the receptacle and the selected arrangement of food dispensing components on the receptacle to increase the heat transfer between the receptacle and the selected arrangement of food dispensing components on the receptacle.

8. The food dispenser in accordance with claim 7 wherein the receptacle includes at least one thermally-conductive divider wall removably mountable on the retaining wall at selected positions between the side walls for dividing the receptacle into predetermined receiving areas for the selected arrangement of food dispensing components, the divider wall providing additional area of contact between the receptacle and the selected arrangement of food dispensing components on the receptacle to increase heat transfer between the receptacle and the selected arrangement of food dispensing components on the receptacle.

9. The food dispenser in accordance with claim 8 wherein the retaining wall includes a series of elongated slots oriented generally perpendicular to the platform for removably receiving the divider wall at the selected positions in friction fit.

10. The food dispenser in accordance with claim 1 or 4 comprising an insulative cover removably mounted on the dispenser for generally enclosing the selected arrangement of food dispensing components on the receptacle.

11. The food dispenser in accordance with claim 2 or 3 wherein each magazine is disposable to permit replacement with a fresh magazine of portion packs.

12. The food dispenser in accordance with claim 2 or 4 wherein each storage container is configured to dispense food and is disposable to permit replacement by a fresh storage container of food.

13. A temperature-controlled food dispenser comprising:
 (a) a frame;
 (b) a thermally-conductive receptacle on the frame configured to receive and support selected arrangements of thermally-conductive food dispensing components in position on the receptacle to enable heat transfer between the receptacle and the selected arrangement of food dispensing components on the receptacle wherein the receptacle includes at least one thermally-conductive divider wall removably mountable on the receptacle at selected positions for dividing the receptacle into the predetermined receiving areas for the food dispensing components and for contacting the food dispensing components to provide additional area of contact between the receptacle and the food dispensing components to increase heat transfer between the receptacle and the food dispensing components on the receptacle;
 (c) electrically-powered heat exchange means thermally coupled with the receptacle to enable heat transfer between the heat exchange means and the receptacle; and
 (d) power supply means connected with the heat exchange means to enable electrical power to be supplied to the heat exchange means to effect the heat transfer between the heat exchange means and the receptacle to control the temperature of the selected arrangement of food dispensing components on the receptacle.

14. The food dispenser in accordance with claim 13 wherein the receptacle includes a series of elongated slots for removably receiving the divider wall in friction fit at the selected positions.

15. The food dispenser in accordance with claim 1, 4, or 13 wherein said power supply means includes:
 (a) power input means for connection with a source of AC power;
 (b) a transformer having a primary winding connected with the power input means and a secondary winding, the transformer converting AC voltage supplied to the primary winding to a desired AC voltage at the secondary winding;

(c) rectifier means connected with the secondary winding and said heat exchange means for rectifying the AC voltage from the secondary winding of the transformer to a desired DC voltage for supply to said heat exchange means.

16. The food dispenser in accordance with claim 15 including switch means connected with the heat exchange means to switch polarity of the D.C. voltage supplied to said heat exchange means to change direction of heat transfer between the heat exchange means and the receptacle to selectively heat and selectively cool the receptacle.

17. A temperature-controlled food dispenser comprising:

(a) a frame;

(b) a thermally-conductive receptacle on the frame configured to receive and support selected arrangements of thermally-conductive food dispensing components in position on the receptacle to enable heat transfer between the receptacle and the selected arrangement of food dispensing components on the receptacle;

(c) electrically-powered heat exchange means thermally coupled with the receptacle to enable heat transfer between the heat exchange means and the receptacle;

(d) power supply means connected with the heat exchange means to enable electrical power to be supplied to the heat exchange means to effect the heat transfer between the heat exchange means and the receptacle to control the temperature of the selected arrangement of food dispensing components on the receptacle; and (e) switch means connected with the heat exchange means to selectively change direction of heat transfer between the heat exchange means and the receptacle to selectively heat and selectively cool the receptacle.

18. The food dispenser in accordance with claim 1, 4, 13, or 17 wherein said heat exchange means includes an electrically powered thermoelectric heat transfer module for converting electrical power to thermal energy, the module being electrically connected with the power supply means and thermally coupled with the receptacle to effect heat transfer between the thermoelectric module and the receptacle.

19. The food dispenser in accordance with claim 1, 4, 13, or 17 wherein the heat exchange means includes a heat transfer assembly thermally coupled with the receptacle to effect heat transfer between the heat transfer assembly and the receptacle, the heat transfer assembly including:

(a) an electrically powered thermoelectric heat transfer module for converting electrical power to thermal energy electrically connected with the power supply means, the module having a first side for extracting heat and a second side for radiating heat;

(b) a thermally-conductive shoe in contact with the first side of the thermoelectric module and in thermal contact with the receptacle to enable heat transfer between the module and the receptacle;

(c) a heat sink in thermal contact with the second side of the module to enable heat to be radiated from the module; and (d) means for holding the thermoelectric module in thermal contact with the shoe and the heat sink.

* * * * *

UNITED STATES PATENT AND TRADEMARK OFFICE
CERTIFICATE OF CORRECTION

PATENT NO. : 4,738,114
DATED      : April 19, 1988
INVENTOR(S): Joseph F. Mullen It is certified that error appears in the above-identified patent and that said Letters Patent is hereby corrected as shown below:

On the title page under [56] References Cited, the following additional references should be added:

U.S. PATENT DOCUMENTS

| | | | |
|---|---|---|---|
| 3,149,471 | 9/1964 | Boehmer | 62/3 |
| 3,252,504 | 5/1966 | Newton  | 165/2 |

FOREIGN PATENT DOCUMENT

| | | |
|---|---|---|
| 3040490 | 5/1981 | Germany |

Col. 3, line 32, "positionnd" should be --positioned--;

Col. 9, lines 58,59, delete "different sized food dispensing components in the form of";

Col. 10, line 11, after "of" insert --different sized food dispensing components in the form of--.

Signed and Sealed this

Twenty-seventh Day of September, 1988

Attest:

DONALD J. QUIGG

*Attesting Officer*    *Commissioner of Patents and Trademarks*